Dec. 23, 1969  R. E. BENNER  3,485,092
PUSH-PULL TESTER WITH FORCE-LIMITING FIXTURE
Filed April 22, 1968

INVENTOR
RUSSELL E. BENNER

BY Watson, Cole, Grindle &
Watson
ATTORNEYS

United States Patent Office 3,485,092
Patented Dec. 23, 1969

3,485,092
PUSH-PULL TESTER WITH FORCE-LIMITING
FIXTURE
Russell E. Benner, Quakertown, Pa., assignor to Valco Product Development, Inc., Bethlehem, Pa., a corporation of Pennsylvania
Filed Apr. 22, 1968, Ser. No. 723,142
Int. Cl. G01n 3/28
U.S. Cl. 73—93                                    5 Claims

ABSTRACT OF THE DISCLOSURE

This force-limiting fixture is used in pushpull testing apparatus and provides a means for exerting a pre-set value of tensive or compressive force, which represents a non-destructive test load, on the workpiece. It includes means for adjusting the pre-set value of tensive or compressive force to activate switching means for stopping the force-limiting fixture at the pre-set force value. Means are also provided for setting a range of desired rates of force loading.

---

This invention relates to force testing equipment and more particularly to a force-limiting fixture for providing pre-set values of tensive or compressive force and different desired rates of force loading.

The force-limiting fixture of this invention is designed to be used with the force tester described in U.S. Patent No. 3,344,653 issued to Russell E. Benner on Oct. 3, 1967. The force tester described therein was directed primarily to an application involving the determination of the release force of a triggered impact tool device. However, with slight modification, that apparatus may also be used in the more general application of push-pull testing wherein the desired push or pull force is provided by the motor screw-driven table and the force reading is obtained by suitable gauge means. The force-limiting fixture of the present invention is directed to apparatus which can be used with the aforementioned tester to provide such push-pull testing.

Prior known push-pull testing devices provide only a predetermined displacement and rate of displacement of the loading fixture which are suitable only for providing a predetermined deformation of, or loading to, the workpiece resulting in the destruction of the workpiece. The force-limiting fixture of the present invention provides means for stopping the tester when a particular, pre-set value of tensive or compressive force is attained. Consequently, the workpiece may be subjected to a non-destructive test load. This non-destructive test feature of the present invention represents a unique innovation in testers of the push-pull class. Additionally, the rate at which the load is applied to the workpiece is variable and may be easily controlled and adjusted.

A primary object of this invention is to provide a force-limiting fixture for accurately applying a pre-set value of tensive or compressive force to a workpiece or load.

A further object of the invention is to provide a force-limiting fixture which may be adjusted to vary the rate at which force is applied to the workpiece.

Another object of the invention is to provide an improved force-limiting fixture for push-pull testing devices which affords non-destructive testing of the workpiece at different pre-set values of tensive or compressive force.

In accordance with the invention, there is provided a power driven movable carriage and associated force reading gauge. The carriage may be moved in either of two directions to provide the necessary push or pull force to the workpiece which is mounted between the carriage and the force gauge to receive the tensive or compressive forces applied by the controlled movement of the carriage. The tensive or compressive force loads are measured by the force reading gauge. A force-limiting fixture is mounted to the movable carriage and comprises a U-shaped member including a movable shaft mounted between the upright arms of the fixture. A compression spring is mounted on the shaft to engage, at one end, one of the upright arms and, at the other end, adjustable collar means mounted to slip over the individual coil springs. Movement of the adjustable collar to different positions on the shaft to engage different individual coil springs alters the spring's spring scale and thereby affords means for altering the rate at which the spring force is generated as the spring is compressed between the upright arm and the adjustable collar.

A second adjustable collar and locknut threadably engages that portion of the movable shaft which lies outside of the upright arm and the first adjustable collar. Switching means are mounted to this upright arm to be activated by contact with a surface of the adjustable collar as the shaft is moved in the force-limiting fixture. The distance through which the shaft must travel before the switch means is activated is varied in accordance with the position of the second adjustable collar on the shaft. Adjustment of the second collar affords means for altering the magnitude of the tensive or compressive forces since the switch means may be connected to the motor to turn it off and stop movement of the carriage and thereby control the amount of compression of the spring.

Workpiece holders or jigs are mounted at both ends of the shaft. Preferably the force fixture is mounted to the carriage to enable it to be swiveled one hundred and eighty degrees such that either one of the workpiece holders may be facing the force gauge. A compressive force will be provided at one workholder by one of the two alternative movements of the carriage; and, by swiveling the fixture one hundred eighty degrees, a tensive force will be provided at the other workpiece holder with the other alternative movement of the carriage. In this manner both compressive and tensive forces may be provided to a workpiece by only compressing the spring in the fixture.

A three-position rotary switch is preferably provided to control the motor driven carriage and afford the operator of the test apparatus tensive forces, compressive forces or destructive push-pull testing of a workpiece.

The above features and other particulars and advantages of the invention are described in the following specification with reference to the accompanying drawings, wherein.

Figure 1:
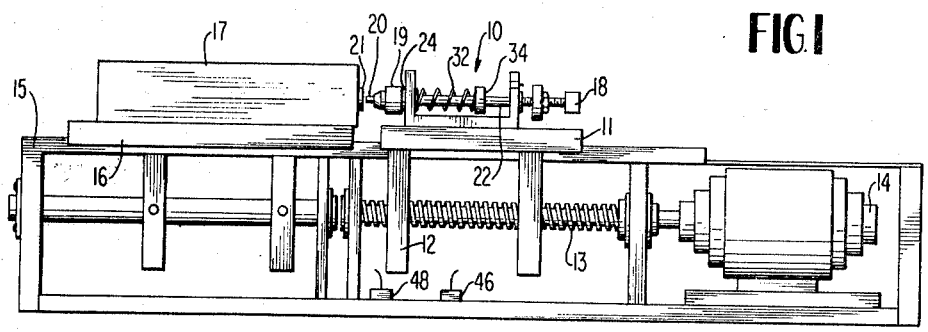
FIGURE 1 is a side view of a test table including the force-limiting fixture in accordance with the principles of this invention.

With reference to FIGURE 1, force-limiting fixture 10 is clamped to movable carriage 11 which is moved by motor-driven screw mechanism 13. A power source, such as reversible motor 14 is used to drive screw 13 to advance carriage 11 linearly either to the right or left as shown in the figure. Table 16 is mounted to frame 15 of the test device for containing the load cell or force gauge unit 17. Table 16 may advantageously be mounted to frame 15 at adjustable positions. Shaft 21 extends from load cell 17 and is in alignment with workpiece holder 19 to firmly clamp or secure workpiece 20.

Spring 32 is mounted on shaft 22 of force-limiting fixture 10 with one end abutting against upright arm 26 and the other end abutting against collar 34. The position of the force-limiting fixture as shown in FIGURE 1 is used for tension testing; the tensive forces being generated on workpiece 20, which may, for example, be a wire, by driving carriage 11 to the right. Movement of carriage 11 to the right causes spring 32 to be compressed against collar 34 as shaft 22 moves through its support in upright 26.

For compression testing, force-limiting fixture 10 is swivelled 180° on carriage 11 and workholder 18 faces force gauge unit 17. Carriage 11 is then driven to the left to provide a compressive force upon a workpiece inserted between workholders 18, 21. The means for swiveling force-limiting fixture on carriage 11 is not shown for purposes of clarity and forms no feature of the instant invention as any suitable or convenient means may be used for this purpose.

Figure 2:
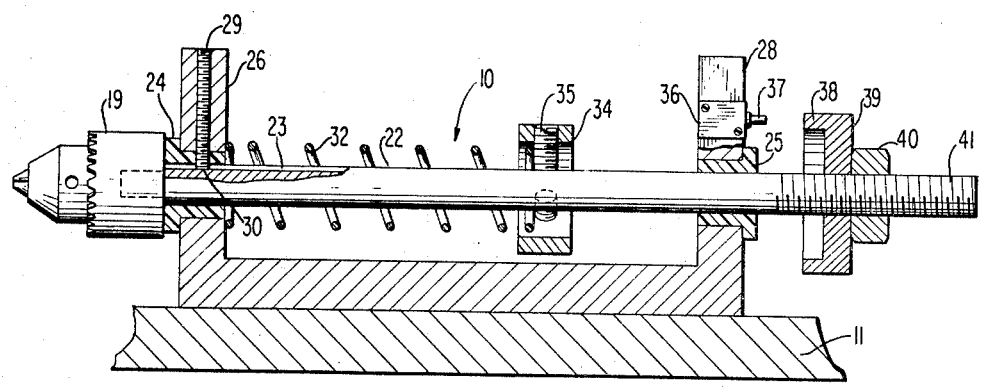
FIGURE 2 is a detail view, partly in section, of the force-limiting fixture.

With reference to FIGURE 2, force-limiting fixture 10 comprises shaft 22 which is mounted within bushings 24, 25, respectively, in upright frame members 26, 28. Bushings 24, 25 are preferably made from Teflon since this material provides a durable bushing having a relatively low coefficient of friction. Screw 9, having key end 30, is provided in upright frame member 26 such that key end 30 engages longitudinal slot 23 in shaft 22 to prevent shaft 22 from rotating.

Spring 32 is mounted on shaft 22 with one end engaging an end surface of upright frame member 26 and with the other end engaging fixed collar 34. Fixed collar 34 includes threads 34a which are constructed to accommodate the individual coil windings of spring 32 such that collar 34 may be moved over spring 32 and locked in any position on shaft 22 by set screw 35 which engages the upper surface of the shaft to firmly fix collar 34 in the desired position. Set screw 35 is arranged to fit between the individual coil windings of spring 32 when collar 34 is moved over the spring.

The positioning of fixed collar 34 over different portions of the individual coil windings of spring 32 enables the spring scale to be varied. The changing of the spring scale, as well as the speed of travel of carriage 11, affords means for adjusting the rate of load applied either in tension or in compression. The relation is:

rate of load (lb./min.) = spring scale (lb./in.)
$x$ carriage speed (in./min.)

It is therefore apparent that a wide range of rates of applying tensive or compressive loads may be obtained by appropriately varying the spring scale and/or the carriage speed.

Microswitch 36 is mounted in upright frame member 28, as shown in FIGURE 2, with movable contact 37 facing leg 38 of adjustable collar 39 which threadably engages threaded portion 41 of shaft 22. Locknut 40 affords a means for firmly securing adjustable collar 39 in a given position on shaft 22. It is apparent that the load, either compressive or tensive, that is applied to a workpiece may be varied by increasing or decreasing the spacing of movable contact 37 from leg 38. This is readily apparent from a consideration of the force-limiting fixture as shown in FIGURE 1 when it is assumed that the movable carriage 11 is moving to the right. With fixed collar 34 in a given position on shaft 22, it is apparent that the tensive load applied to workpiece 20 will be dependent upon the amount of compression of spring 32 as the force-limiting fixture frame is moved to the right by carriage 11. Thus, decreasing or increasing the spacing between movable contact 37 and leg 38 will cause the force exerted by spring 32 to either be lessened or increased, respectively.

Switch 36 is inserted in the electric motor drive circuit to stop the electric motor when contact 37 is depressed. This causes the movement of movable carriage 11 to be abruptly terminated. Movable carriage 11 will have extremely little tendency to "coast" when the current to the motor is interrupted by switch 36 since the load presented to the motor by lead screw 13 is extremely high. Therefore, the positioning of the adjustable collar will accurately determine the maximum load applied to the workpiece.

Figure 3:
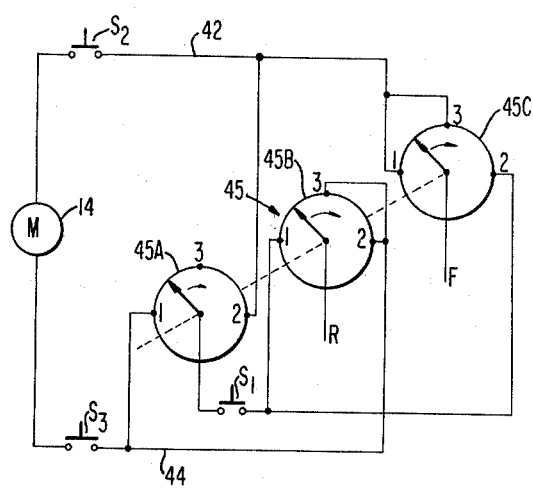
FIGURE 3 is a schematic of a control circuit illustrating an operable embodiment of this invention.

FIGURE 3 shows a schematic of an electric circuit to enable the push-pull tester to be selectively switched for force-limit testing in compression, tension or to destructively test the workpiece. Switches $S_2$, $S_3$ are respectively inserted in the forward and reverse power leads to motor 14. Rotary switch 45 is a three-gang, three-position, non-shorting type switch. Limit switch $S_1$ corresponds to switch 36 in FIGURE 2. The three switch terminals of the individual switch sections 45a, 45b, 45c of rotary switch 45 are connected to the forward and reverse power leads of motor 14 as shown in FIGURE 3 with switch $S_1$ of the force-limiting fixture inserted in series with either the reverse or forward lead to the electric motor depending upon whether the gang switch is respectively either in positions 1 or 2. With switch 45 in either position 1 or 2, the activation (opening) of switch $S_1$ will interrupt current to motor 14 and thereby turn it off. As mentioned previously, tension testing is accomplished by moving carriage 11 to the right and compression testing is accomplished by swiveling force-limiting fixture 10 one hundred and eighty degrees on movable carriage 11 and causing carriage 11 to be moved to the left as shown in FIGURE 1. Therefore, assuming that the operation of the motor in a forward direction causes carriage 11 to move to the right and operation of motor 14 in the reverse direction causes movement of carriage 11 to the left, position 1 of switch 45 corresponds to compression testing and switch position 2 corresponds to tension testing. Reverse power to motor 14 is interrupted by the opening of switch $S_1$ when rotary switch 45 is in position 1, and the forward current to motor 14 is interrupted by the opening of switch $S_1$ when rotary switch 45 is in position 2. Position 3 removes switch $S_1$ from the circuit and carriage stopping limiting switches $S_2$ and $S_3$ control the current to motor 14. Switches $S_2$, $S_3$ correspond to switches 46 and 48 shown in FIGURE 1. In this position, destructive testing may be conducted since movement of carriage 11 to the left, or to the right, will be controlled by the activation of switch 46 or 48 by the engagement of leg 12 with the respective switch contacts.

A highly advantageous feature of the hereinbefore described system is that the accuracy of the force reading by the gauge is not affected by inaccuracies or friction in the force-limiting fixture. The force gauge will push or pull against one end of the workpiece and the force-limiting fixture will push or pull against the other end of the workpiece. Regardless of friction or inaccuracies in the force-limiting fixture, the true load present on the workpiece when the fixture stops the carriage motion will be indicated by the gauge (within gauge accuracy). The gauge may be calibrated with respect to the position of the adjustable collar on the shaft to set the force-limiting fixture for the desired "cut-off" load. The versatility and usefulness of the push-pull tester is greatly enhanced by providing means for varying the spring scale whereby the rate of applying either a tensive or compressive load may be altered.

The foregoing detailed description of the invention and its various features provides a testing device for push-pull testing wherein the force applied to the workpiece may be accurately cut-off at a predetermined loading and the novel features believed descriptive of the scope and the nature of the invention may be varied without altering the principles involved. Therefore, having provided a new and improved test apparatus, it is intended that the scope of the invention be limited only by the following claims.

I claim:
1. Test apparatus for applying compressive and tensive forces to a workpiece, comprising:
   force measuring means for determining the force applied to the workpiece,
   carriage means for moving the workpiece with respect to the force measuring means to provide tensive or compressive forces on the workpiece, and
   force limiting means mounted on the carriage means for controlling the movement of the carriage means to provide selected non-destructive forces on the workpiece,
   said force limiting means includes force producing means for generating selected forces on said workpiece and adjustable means for determining said selectable forces produced by said force producing means, and
   said force limiting means further includes additional adjustable means engaging with said force producing means for altering the rate at which said selected forces are generated.

2. Test apparatus according to claim 1, wherein said force limiting means further includes switch means cooperating with said force producing means and said adjustable means for controlling the position of said carriage means to provide a given selected force,
   said carriage means translates linearly toward or away from said force measuring means to provide a compressive force or a tensive force on said workpiece and further comprising control means for selecting the movement of said carriage means,
   said control means comprises a three-position switch including a first position for moving said carriage means to provide a tensive force on said workpiece, a second position for providing a compressive force on said workpiece, and a third position whereby said carriage means moves repetitively to and from said force measuring means.

3. Test apparatus according to claim 2 wherein the force limiting means comprises a U-shaped member mounted to the carriage means, a shaft mounted in the arms of the U-shaped member to be movable in alignment with the force measuring means, the adjustable means includes a movable collar mounted on the shaft and a locking nut mounted on the shaft for locking the movable collar to the shaft, the additional adjustable means consists of an additional collar mounted on the shaft between the arms of the U-shaped member, the force producing means consists of a spring mounted on the shaft between an arm of the U-shaped member and the additional collar, the additional collar is movable over the individual coil springs and including locking means for securing the additional collar to the shaft, and the switch means is mounted to an arm of the U-shaped member to contact the movable collar with movement of the shaft as the carriage is moved with respect to the force measuring means.

4. Test apparatus according to claim 1 wherein said force producing means includes support means mounted to said carriage, a shaft movably mounted to said support means, helical spring means fixed to said support means, said additional adjustable means engaging said shaft and said helical spring means at different positions to alter the rate at which said selected forces are generated.

5. Test apparatus according to claim 4 wherein said additional adjustable means consists of a collar having a central aperture, said shaft and said helical spring means are movable within said aperture, and said additional adjustable means including means for locking said collar to said shaft to render inoperative a portion of said helical spring means.

References Cited

UNITED STATES PATENTS

| | | | |
|---|---|---|---|
| 3,135,106 | 6/1964 | Lazan | 73—93 X |
| 3,187,565 | 6/1965 | Kreiskorte et al. | 73—92 X |
| 3,344,653 | 10/1967 | Benner | 73—11 |

JERRY W. MYRACLE, Primary Examiner

U.S. Cl. X.R.

73—141